June 13, 1950  W. H. WANNAMAKER, JR  2,511,608
VARIABLE INDUCTANCE CONTROL DEVICE
Original Filed June 22, 1944  3 Sheets-Sheet 1

*INVENTOR.*
WILLIAM H. WANNAMAKER JR.
BY
*C. B. Spangenberg*
ATTORNEY.

June 13, 1950     W. H. WANNAMAKER, JR     2,511,608
VARIABLE INDUCTANCE CONTROL DEVICE
Original Filed June 22, 1944     3 Sheets-Sheet 2
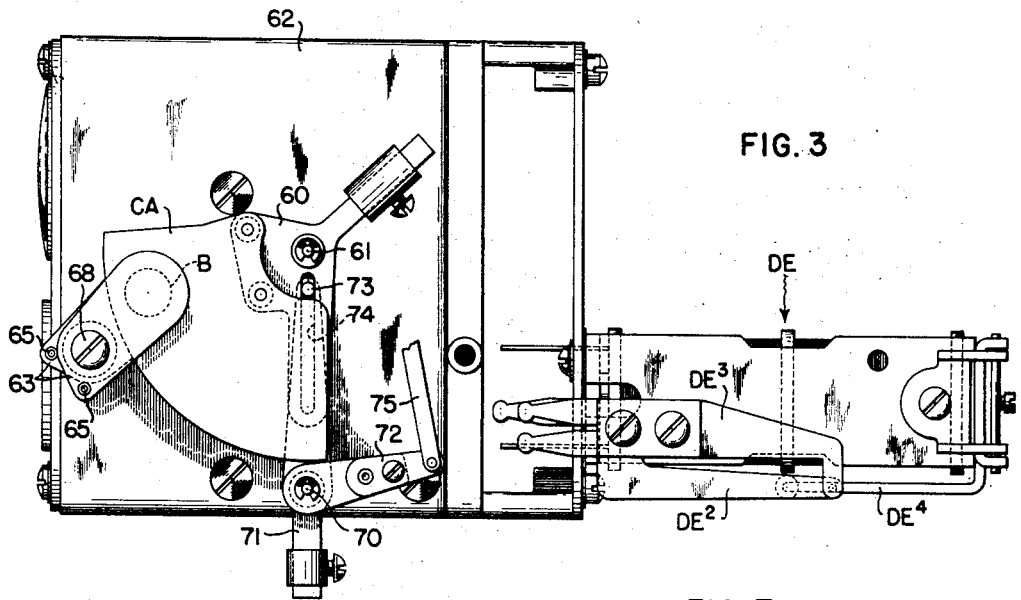
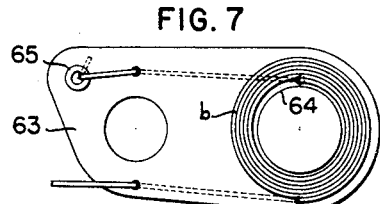
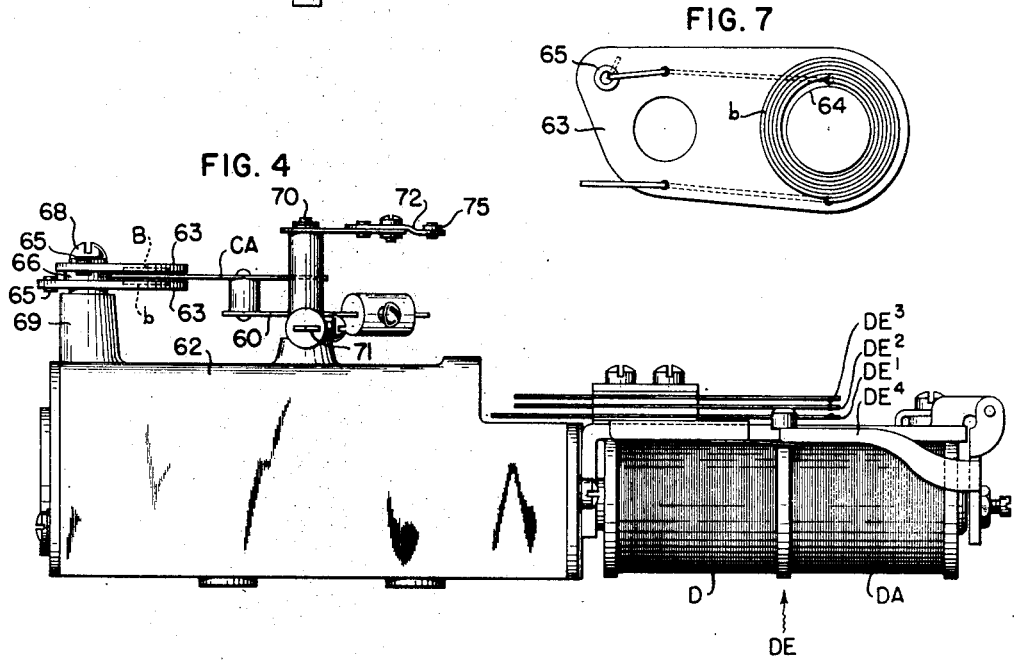
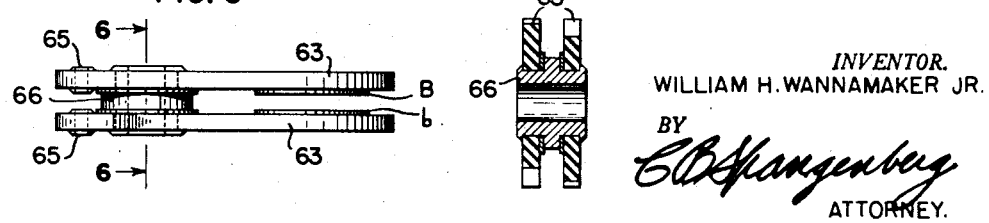
INVENTOR.
WILLIAM H. WANNAMAKER JR.
BY
C. B. Spangenberg
ATTORNEY.

June 13, 1950   W. H. WANNAMAKER, JR   2,511,608
VARIABLE INDUCTANCE CONTROL DEVICE Original Filed June 22, 1944    3 Sheets-Sheet 3

*INVENTOR.*
WILLIAM H. WANNAMAKER JR.
BY
C. B. Spangenberg
ATTORNEY.

Patented June 13, 1950

2,511,608

UNITED STATES PATENT OFFICE 2,511,608

VARIABLE INDUCTANCE CONTROL DEVICE

William H. Wannamaker, Jr., Flourtown, Pa., assignor, by mesne assignments, to Minneapolis-Honeywell Regulator Company, Minneapolis, Minn., a corporation of Delaware Original application June 22, 1944, Serial No. 541,575. Divided and this application July 25, 1945, Serial No. 607,034

7 Claims. (Cl. 171—242)

The general object of the present invention is to provide an improved variable inductance device. More specifically, the object of the present invention is to provide a simple and effective inductance device of the type comprising a pair of inductance coils which are in mutual inductive relation with one another and which are separated by a space adapted to receive a conducting vane or plate which varies the mutual inductance of the coils as its position relative to the coils is varied.

My improved inductance device, which may take various forms, was devised primarily for use in control systems of the type disclosed and claimed in my prior application, Serial No. 541,575, filed June 22, 1944, of which the instant application is a division. The type of control system disclosed in said prior application is characterized by its inclusion of an electronic tube and associated means through which the tube is caused to oscillate or not to oscillate, and to thereby effect different control actions accordingly as a control quantity or condition has one or another value.

My improved inductance device was primarily devised for use in variably coupling the grid and plate circuits of a control system of the above mentioned type, to thereby make the tube of the system oscillate or not oscillate, as the mutual inductance of the coils of said device is varied by the associated controlling vane or element. A primary object of the present invention is to provide a variable inductance of the type described which is characterized by the wide range through which the mutual inductance of its coils may be varied with suitable precision.

Specific objects of the present invention are to provide a variable inductance device of the type specified and characterized by its mechanical simplicity, by the flat form and close spacing of its coils and by the inherent capacity of the inductance device for adjustment relative to the path of movement of an associated vane or conducting body.

The various features of novelty which characterize my invention are pointed out with particularity in the claims annexed to and forming a part of this specification. For a better understanding of the invention, however, its advantages, and specific objects attained by its use, reference should be had to the accompanying drawings and descriptive matter in which I have illustrated and described preferred embodiments of the invention.

Of the drawings:

Fig. 3 is an elevation on a larger scale of a portion of the apparatus shown in Fig. 2;

Fig. 4 is a view taken at right angles to Fig. 3;

Fig. 5 is an enlarged reproduction of a portion of Fig. 4;

Fig. 6 is a section on the line 6—6 of Fig. 5;

Fig. 7 is an elevation of one of the coils shown in Fig. 6;

Figure 1:
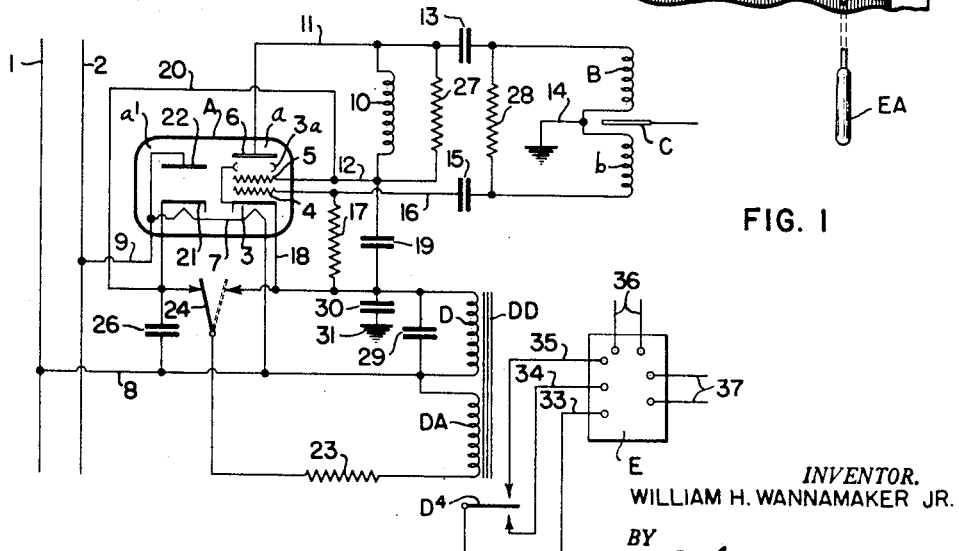
Fig. 1 is a diagrammatic representation of a control system in which my improved inductance device may advantageously be used.

In Fig. 1 I have diagrammatically illustrated one of the control system circuit arrangements disclosed and claimed in my prior application, Serial No. 541,575 and comprising an electronic tube A and associated coils B and b, the mutual inductance of which depends upon the position of an inductance shield or vane C. The latter is formed of sheet metal such as aluminum, copper or brass of good electrical conductivity and by changes in its position relative to coils B and b, varies the mutual inductance of those coils in a known manner. The vane C may be carried by the deflecting arm of such a control instrument as the instrument H shown in Fig. 2.

While the invention claimed herein includes no portion of the apparatus shown diagrammatically in Fig. 1 other than the coils B and b and vane C, an understanding of the characteristics and operation of the control system shown in Fig. 1 will contribute to a full understanding of the present invention and its advantages. The tube A, shown in Fig. 1, is a rectifier, beam power amplifier tube commonly known as the 117 N7-GT tube and comprising a tetrode valve or section $a$ and a diode valve or section $a'$. The tetrode valve $a$ comprises a cathode 3 with beam plate extensions $3a$, a control grid 4, a screen grid 5 and a plate 6. The tube A includes a filament heater 7 serving both valves $a$ and $a'$ and having its terminals connected by conductors 8 and 9 to alternating current supply conductors 1 and 2. The plate 6 is connected to the screen grid 5 by a choke coil 10 and conductors 11 and 12. The conductor 11 also connects the plate 6 through a condenser 13 to one terminal of the coil B. The other terminal of the coil B is connected to one terminal of the coil $b$ and the connected coil terminals have a common ground connection 14. The second terminal of the coil $b$ is connected to the control grid 4 by a condenser 15 and conductor 16. The conductor 16 is connected to the cathode 3 by a resistance 17 and conductor 18.

The conductor 18 also connects the cathode 3 to one terminal of a relay coil D. The latter has its second terminal connected to the supply conductor 1 by the conductor 8. The conductors 12 and 18 are connected by a condenser 19. The conductor 12 is also connected by a conductor 20 to the cathode 21 of the diode valve $a'$. The plate 22 of that valve is connected through the conductor 9 to the alternating current supply conductor 2. The relay coil D forms part of an electromagnetic relay DD which also includes a second relay coil DA. The latter has one terminal connected to the conductor 8 and has its second terminal connected through a resistance 23 to a movable switch member 24. In its full line position the switch member 24 is connected to the conductor 20 and thereby to the cathode 21 of the diode $a'$. In its dotted-line position, the switch member 24 is connected to the conductor 18 and thereby to the cathode 3 of the tetrode $a$. The conductors 8 and 20 are connected by a condenser 26. The choke coil 10 is shunted by a resistance 27. The terminals of the coils B and $b$ connected to the condensers 13 and 15, respectively, are advantageously connected by a resistance 28. The terminals of the coil D are connected by a condenser 29. The conductor 18 is connected to ground at 31 through a condenser 30.

The control system shown in Fig. 1 is operable in one or the other of two ways, accordingly as the switch 24 occupies its full-line position or its dotted-line position. In normal operation with the switch 24 in its full-line position a portion of the plate current flowing from supply conductor 2 through conductor 9, diode plate 22 and cathode 21, flows through the switch 24, resistance 23, relay winding DA and conductor 8 to the supply conductor 1. Another portion of the diode plate current then flowing through conductor 9, plate 22 and cathode 21, passes through conductors 20 and 12, choke coil 10, conductor 11, plate 6, cathode 3, conductor 18 and relay winding D to the conductor 8 and thence to the supply conductor 1. The relay windings D and DA are so proportioned that with the switch 24 in its full-line position the relay DD is energized or deenergized, accordingly as the valve $a$ is or is not oscillating. When the valve $a$ is not oscillating the current flow through the coil D is sufficient to neutralize the opposing effect of the current flow through the coil DA and thereby deenergize the relay DD. When the valve A oscillates its space current diminishes and the relay DD is then energized by the greater current flow through coil DA.

The armature $D^4$ of the relay DD connects the terminal 33 to the terminal 34, or to the terminal 35 of a regulator E, accordingly as relay DD is deenergized or energized. The regulator E may be of a known type receiving energy through supply conductors 36 and transmitting energy, for example, heating current to a furnace, through conductors 37 when the relay DD is energized and the armature $D^4$ engages the terminal 35, but not when armature $D^4$ engages the terminal 34. With the regulator E operating as described, and with the relay DD operatively energized only under the condition in which the regulator needs to transmit energy to the conductors 37, the control system will fail safely. That is to say, any operating defect which prevents the space current flow through the valve $a'$ from being large enough to operatively energize the relay DD, will prevent the regulator E from transmitting energy through the conductors 37.

When the switch 24 is in its dotted line position, the relay coil sections D and DA are connected in parallel in the plate circuit of the valve $a$, and the branch circuit then including the coil D, and the branch circuit including the coil DA and resistance 23 are so proportioned that the relay energizing effect of the coil D exceeds that of the coil DA, but not sufficiently to operatively energize the relay DD, except when the valve $a$ is not oscillating so that the plate current of that valve is relatively large.

The condenser 26 connects the diode cathode 21 to the conductor 8 and thereby to the supply conductor 1. This insures D. C. operation of the valve $a$, and thus contributes to operational stability. The relay DD is responsive to very small changes in the total current flow through its coils D and DA, and operates safely in case of tube or power-line failure with the switch 24 in either of its two operating conditions. This makes it practically possible, as is advantageous in some cases, to energize and deenergize the relay DD on and as a result of changes in the mutual inductance of the control coils B and $b$ without decreasing their mutual inductance sufficiently to cause the valve $a$ to stop oscillating.

Figure 8:
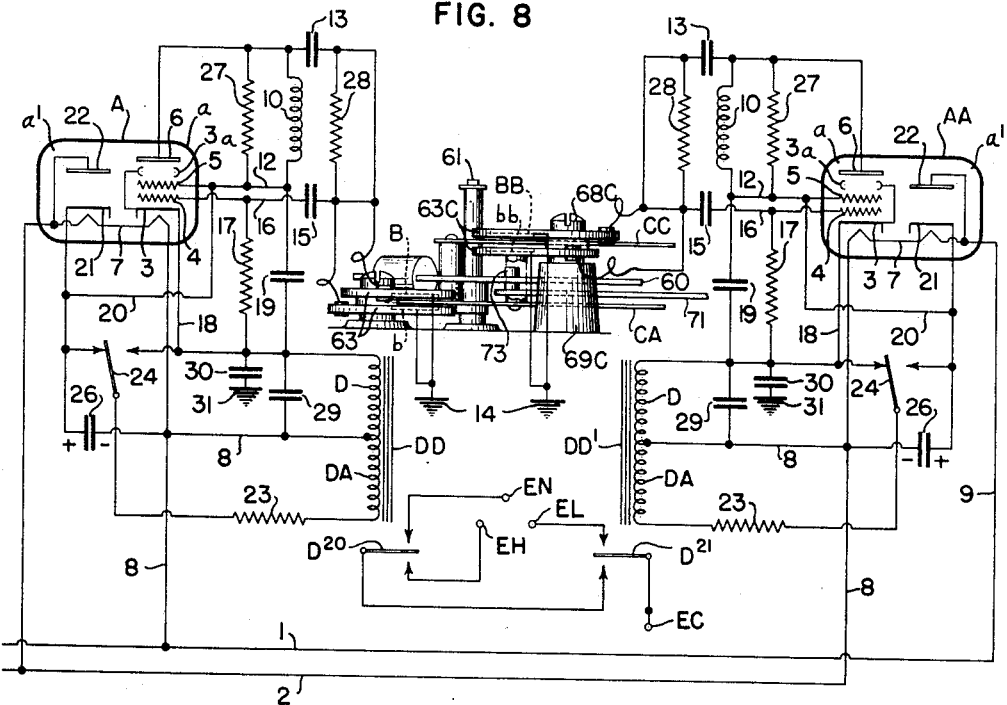
Fig. 8 is a diagram illustrating a three-position control system including two electronic tubes and a form of my improved inductance coil device comprising a separate pair of coils associated with each of said tubes.

The resistor 28 insures substantially complete stability of the oscillator system and positively prevents the valve $a$ from oscillating when the vane C is fully interposed between the coils B and $b$. I have experimentally determined that the sensitivity of the response of a practical form of the control system shown in Fig. 1 to movement of the vane C is not affected by the use of the resistor 28 if the resistance of the latter is above 10,000 ohms. The degenerative effect of the resistance 28 is especially desirable in the case of a multi-oscillator system which may be used for three-position control as shown in Fig. 8.

The resistance 27 increases the tolerances permissible in positioning the control coils B and $b$ relative to one another and the vane C. Resistance 27 reduces the ratio of inductance to resistance of the circuit including the choke coil 10 and this operates to limit the effective impedance of the circuit into which the anode 6 works to some value less than the value of the resistance 27. Resistance 27 may desirably have a value of 3,000 ohms.

With its control coils B and $b$ in the form of flat, closely spaced spirals, as illustrated in Figs. 2–7 and hereinafter described, the control system shown diagrammatically in Fig. 1 is characterized by its inherent simplicity, reliability and capacity for operation with high sensitivity. It is practically feasible to proportion and design such a system so that the tube A will be rendered oscillating or non-oscillating, by a movement of the portion of the edge of the vane C adjacent the common axis of the coils B and $b$, which is not greater than one-thousandth of an inch. By way of example, and not by way of limitation, it is noted that in one practical embodiment of the control system in Fig. 1, the capacitances of the condensers 13 and 15 are 0.00005 and 0.00007 mfd., respectively, and the capacitance of each of the condensers 19 and 30 is 0.001 mfd., though the capacitance value of neither is critical. The capacitance of the condenser 29 is 2.0 mfd. The capacitances of the condensers 13 and 15 with the capacitance of the tube A and the distributed capacitances of the circuit elements provide the capacitance in the series resonant circuit portions of the system. The condensers 13 and 15 also serve as blocking condensers preventing risk of injurious current flow through coils B and b, due to the normal 60 cycle, 110–120 volt potential between the supply conductors 1 and 2. The condensers 19 and 30 serve as by-pass condensers and their respective capacitances are not critical as noted above.

In Figs. 2–7 I have illustrated an instrument H of especially desirable form embodying a control system of the form shown in Fig. 1 and embodying a preferred structural form of the variable inductance device claimed herein. The vane CA of the instrument H is an arc shaped body of sheet metal of good conductivity such as aluminum, copper or brass attached to a pivoted support 60. The latter is mounted on a horizontal pivot 61 carried by the mechanism casing 62 and is suitably counter-weighted to free the vane from gravitational bias. The inductance coils B and b are flat spirals each mounted on an individual support 63 and comprising a few convolutions only. As shown, each coil includes 5½ turns, but I have obtained good results with as many as 11½ convolutions in each coil. In the preferred form illustrated, the two supports 63 are counterparts, each being a plate-like body of insulating material deformed to provide a circular boss or projection 64 at one side about which the corresponding coil B or b is wound. The coil terminals extend through and are anchored by cement in holes formed in the support 63, and in practice, the body of each of the coils B and b is anchored to the corresponding support 63 by cement. One terminal of each coil passes away from the corresponding coil support 63 through a grommet 65 in the latter. The two coil supports 63 are advantageously connected to form a single mechanical unit by a metallic eyelet or hub part 66 which extends through a portion of each support displaced from its bosses 64. As shown, the unit including one coil B and one coil b and their supports 63 is detachably secured by a clamping screw 68 to the end of a post portion 69 of the casing 62. The inductance coil construction just described is mechanically simple and relatively inexpensive, and permits the coils B and b to be spaced accurately and in desirable relation to one another. For example, the distance between the bosses 64 may be one-sixteenth of an inch. In consequence, a very small angular movement of the thin sheet metal vane CA may produce a relatively large change in the mutual inductance of the coils although each of the latter comprises but a few turns or convolutions.

Figure 2:
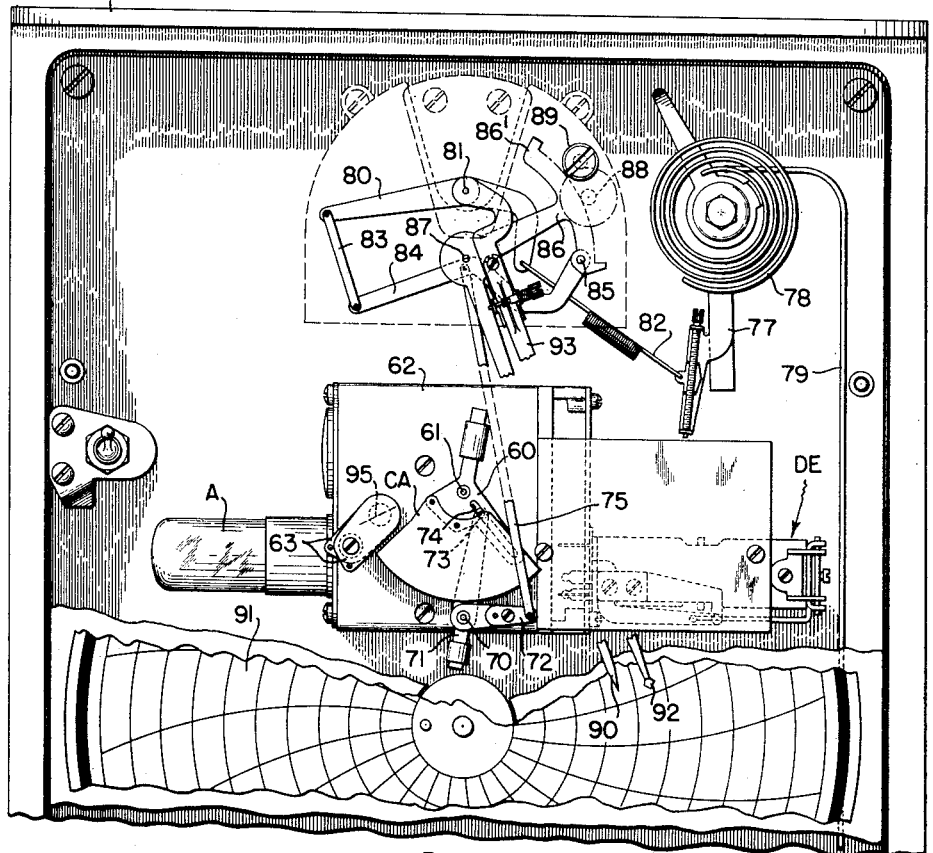
Fig. 2 is an elevation with parts broken away of a portion of a control instrument including one form of the present invention and adapted for use in the control system shown in Fig. 1.

In the instrument shown in Fig. 2, the vane CA is oscillated about the pivot 61 through a pin and slot connection between the vane support 60 and a rocker or lever element mounted on a pivot pin 70 and comprising two lever arms 71 and 72. The arm 71 carries a pin 73 received in an elongated slot 74 formed in the vane support 60 and extending in a general radial direction away from the pivot 61. The second arm 72 of the rocker element 70 is pivotally connected to one end of an actuating link 75 which has its second end connected through a lever and link arrangement of known type to an arm 77 oscillating in accordance with changes in the value of the controlling condition. As shown in Fig. 2, the arm 77 is connected to the free end of a Bourdon tube 78 which has its other end anchored to the instrument casing and connected to one end of a capillary tube 79 through which a variable controlling fluid pressure is transmitted to the Bourdon tube 78. In consequence, the arm 77 oscillates about the axis of the Bourdon tube in the clockwise or counter-clockwise direction, as the pressure transmitted by the capillary 78 respectively decreases or increases.

The known type of link and lever arrangement through which the link 75 is adjusted longitudinally in accordance with angular adjustments of the arm 77, comprises a lever element 80 journalled on a pivot 81 carried by the instrument casing and having one arm connected by a link 82 to the arm 77. A second arm of the lever 80 is connected by a link 83 to one end of a floating lever 84. The other end of the floating lever 84 is pivotally connected by a pivot 85 to a control point adjusting element 86. The latter is pivotally mounted on a pivot pin 87 carried by the instrument casing. The element 86 may be angularly adjusted about the pivot 87 by means including a spur gear 88 in mesh with a spur gear portion 86' of the member 86. The spur gear 86 may be rotated by gearing including an adjusting shaft 89 journalled on the instrument casing and shown as formed with a kerf in one end for screw drive adjustment. The end of the link 75 remote from the rocker arm 72 is pivotally connected to the floating lever 84 intermediate the ends of the latter. The member 86 includes an index arm 90 which indicates on the rotating instrument chart 91 the control point or value which the instrument is intended to maintain approximately constant. The actual value of that control condition is indicated and recorded on the chart 91 by a pen 92 carried at the free end of a pen arm 93 mechanically connected to the lever 80 so as to turn about the pivot 81 in accordance with changes in the value of the pressure transmitted by the capillary 79.

The Bourdon spiral 78 may be connected through the capillary tube 79 to any controlling fluid pressure source. Thus, for example, that source may be a fluid pressure thermometer bulb EA as shown in Fig. 2, and the instrument H may then be employed in such a control system as is shown diagrammatically in Fig. 1 to give the vane CA oscillatory movements relative to the coils B and b, on changes in the temperature of the bulb EA.

Regardless of the origin of the controlling pressure transmitted by the capillary 79 to the Bourdon tube 78, on a decrease or increase in said pressure, the arm 77 operates through its lever and link connection to the rocker arm 72 to turn the vane CA respectively clockwise or counter-clockwise about the pivot 61. The exact angular position into which the vane CA must turn to interrupt the oscillation of the valve $a$ will obviously depend on various control system constants. Ordinarily, however, it will be a position in which the left-hand edge of the vane, as seen in Fig. 2 extends through the space between the bosses 64 of the two coil supports 63, along or near the dotted line 95 of Fig. 2. The respective positions of the vane and coil supports 63 in which the left-hand edge of the vane is alongside the dotted line 95 may be readily adjusted by an angular adjustment of the coil supports about the axis of the clamping screw 68. As previously indicated, changes in the relative positions of an inductance shield or vane and inductance coils of the general character shown in Figs. 2–7 may be so constructed and arranged that a movement of the edge of the vane CA in a direction transverse to the dotted line 95, as great as one thousandth of an inch will be sufficient to cause the valve $a$ to oscillate or to cease from oscillating.

With the pin and slot connection between the rocker arm 71 and the vane CA shown in Fig. 2, the ratio of the angular movements of the vane to that of the rocker arm is relatively very large when the pin 73 is close to the pivot 61 and its movement is generally transverse to the plane including the axes of the pivots 61 and 70 and said ratio diminishes as the pin moves away from said pivot. Advantage of the pin and slot connection characteristic just mentioned may be taken to make the instrument especially sensitive to movement in the portion of its range of movement in which such sensitivity is especially important. Generally, maximum sensitivity is desirable when the vane is in or near the position at which oscillation begins and stops.

As shown, the instrument H includes a differential relay DE which is operatively like the relay DD and comprises resilient switch contacts $DE^2$, DE' and $DE^3$ corresponding operatively to the armature control element $D^4$ and control terminals 34 and 35, respectively, of Fig. 1. The contact $DE^2$ is biased to engage the contact $DE^1$ but is moved out of engagement with that contact and into engagement with the contact $DE^3$ by the armature $DE^4$ as shown in Fig. 4, when the relay DE is energized.

In some cases, more than one pair of control coils similar in construction to the coils B and $b$ shown in Figs. 2–7, are advantageously combined in a control system with a single controlling vane element. Several forms of such a control system are shown and described in my earlier application Ser. No. 541,575, and one of those control system forms is shown in Figs. 8 and 9 hereof.

Figure 9:
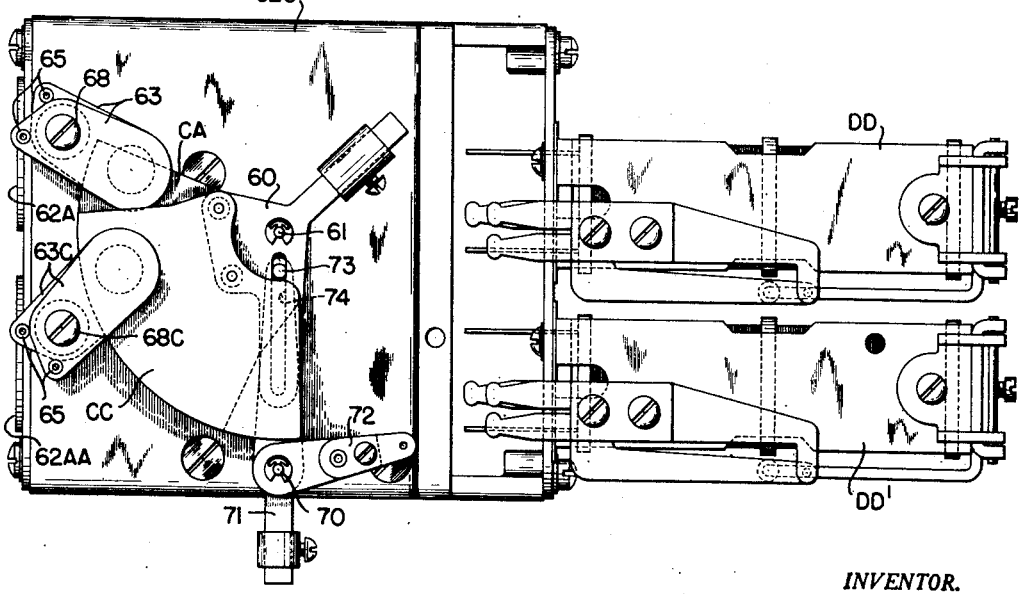
Fig. 9 is an elevation of the inductance device shown in part in Fig. 8.

Figs. 8 and 9 illustrate a three position control system in which two control system units each like the control system shown in Fig. 1 are combined with a single controlling vane element and a single relay mechanism unit, in such manner that the oscillation of the valve $a$ of one unit will be initiated and terminated by movement of the controlling vane element into and out of a position different from that into and out of which it moves to initiate and interrupt the oscillation of the valve $a$ of the other unit.

In the form illustrated in Fig. 8, the two electronic tubes may be and are shown as identical with the previously described tube A, but to simplify the description, one of the tubes shown in Fig. 8 is designated A, and the other is designated AA. The tube A of Fig. 8 is shown as associated with control coils B and $b$ and with a differential relay DD exactly as is the tube A of Fig. 1. The valve AA is similarly associated with control coils and a differential relay which may be duplicates of those associated with the valve A, but for convenience of description the control coils associated with the tube AA are designated BB, and $bb$ and the differential relay associated with the tube AA is designated DD'. Except as above noted, parts shown in Fig. 8 are designated by the reference symbols which are used in Fig. 1 to designate equivalent parts.

To avoid risk of objectionable reaction whereby either of the circuit units shown in Fig. 8 may give rise to oscillation, or interfere with oscillation, in the other unit, I advantageously arrange the two units as shown so that oscillation in each unit can occur only during the half cycles of power-line voltage which alternate with the half cycles during which oscillation in the other unit can occur. To this end the anode 22 of the tube A of Fig. 8 is connected to the supply conductor 2, and the anode 22 of the tube AA is connected to the supply conductor 1, and the winding center tap of the relay DD is connected to the supply conductor 1 while the winding center tap of the relay DD' is connected to the supply conductor 2.

As shown in Figs. 8 and 9 the coils B and $b$ are alongside of, but are laterally displaced from the coils BB and $bb$, and the cooperating vane element comprises two separate, spaced apart, but rigidly connected vane members CA and CC. The vane member CA is formed, mounted and associated with control coils B and $b$ exactly as is the vane member CA shown in Figs. 3 and 4. The vane member CC is a flat metallic plate which may be similar in general shape to the member CA, and its plane is parallel to but laterally displaced from the plane of the member CA. The member CC is rigidly mounted on the same vane supporting member 60 on which the vane member CA is mounted. The coils BB and $bb$ are carried by supports 63C which may be identical with the supports 63 for the coils B and $b$. As shown, the coil supports 63C are mounted on a short post 69C carried by the instrument casing 62C, and are secured in place by a clamping screw 68C. The mechanism casing 62C is provided at one end with sockets 62A and 62AA for the tubes A and AA, and supports the relay elements DD and DD' at its opposite end.

When the vane element shown in Fig. 9 is at the intended limit of its movement in the clockwise direction, the vane CA is interposed between the coils B and $b$. That position of the vane element might be either its "high" position, or its "low" position, depending on the character of the control system in which the vane element is employed. As will be apparent, an adjustment of 180° of the arm 72 relative to the arm 71, will reverse the direction of the angular adjustment of the vanes CA and CC produced by a given longitudinal adjustment of the link 75.

With the particular vane element, control coil, tube and relay arrangement shown in Figs. 8 and 9 the "high" position of the vane element is that in which the vane CA is interposed between the coils B and $b$ and the vane CC is interposed between the coils BB and $bb$, and each of the associated tubes A and AA is then in its non-oscillating condition. Movement of the vane element counter-clockwise about its pivot 61 from its high position into its "neutral" position leaves the vane CC interposed between the coils BB and $bb$, but moves the vane CA into a position in which it is no longer interposed between the coils B and $b$ to the extent required to prevent them from having sufficient mutual inductance to set the tube A into oscillation. In Fig. 9, the vane element is in or near the angular position in which the oscillation of the tube A will be initiated by a small turning movement of the vane element in the counter-clockwise direction. To reach its other end, or "low," position and thereby initiate oscillation of the tube AA, the vane element shown in Fig. 9 must turn in the counter-clockwise direction through an angle somewhat greater than thirty degrees from the position in which oscillation of the tube A is initiated. That angle measures the so-called neutral "width," or range of controlling quantity variation between its "high" and "low" values, and may be adjusted by loosening one or both of the screws 68 and 68C and angularly adjusting the coil supports 63 and 63C toward or away from one another. In normal operation, both tubes A and AA continue to oscillate after the vane element turns into its low position, until the vane element turns clockwise from its "low" position far enough to again interrupt oscillation of the tube AA.

As shown in Fig. 8, the armature contacts $D^{20}$ and $D^{21}$, actuated by the energization and deenergization of the relays DD and DD', respectively, are associated with stationary contacts so as to operatively connect an energizing contact EC to a "low" control terminal EL, or to a "high" position control terminal EH, or to a "neutral" control terminal EN, accordingly as both relays are energized, or both are deenergized, or as relay DD' is deenergized while relay DD is energized. As will be readily apparent, the effect on the energization and deenergization of the relays DD and DD' of Figs. 8 and 9 which is produced by the adjustment of the controlling vane element into its low, neutral and high positions, depends on the form and spatial relation of the controlling coils and vane element, and may be varied as conditions make desirable.

As has already been made apparent the operating characteristics of the system shown in Figs. 8 and 9 may be materially altered by angular adjustment of one or each of the coil supports 63 and 63C about its supporting screw 68 or 68C.

While, in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. In a control structure, the combination with a pair of inductance coil units each comprising a coil support including two rigidly connected, juxtaposed walls and two coils mounted on the said walls of said support at opposite sides of a kerf-like space transverse to the axes of said coils, means supporting said units with the axes of the coils of each unit parallel to the axes of the coils of the other unit, and a vane element movable in a direction transverse to said axes into and out of each of said spaces to thereby vary the mutual inductance of the coils of each unit.

2. In a control structure, the combination with a pair of inductance coil units comprising a coil support including two rigidly connected, juxtaposed walls and two coils mounted on the said walls of said support at opposite sides of a kerf-like space transverse to the axes of said coils, means supporting said coil supports with the axes of the coils of each unit parallel to the axes of the coils of the other unit and with the coils of one unit adjustable relative to the oher in a direction transverse to said axes and a vane element movable transversely to said axes into and out of said spaces to thereby vary the mutual inductance of the coils.

3. A combination as specified in claim 1, in which the kerf-like spaces of the two coil supports are displaced from one another in the direction of said axes, and in which said vane element comprises two vane members displaced from one another to permit movement of one member into one and movement of the other member into the second of said spaces.

4. A combination as specified in claim 1 in which one of said coil supports is angularly adjustable about an axis parallel to and laterally displaced from the axes of the coils.

5. A combination as specified in claim 1 in which each of said coil supports is angularly adjustable about an axis laterally displaced from the axes of the coils.

6. In a control structure, the combination with a vane element movable along a predetermined path, an inductance coil unit comprising a coil support and two coils mounted on said support at opposite sides of a kerf-like space transverse to the axes of said coils and intersected by said path, and supporting means upon which said support is mounted for adjustment about an axis parallel to and laterally displaced from the axes of the coils to thereby adjust said coils into different positions along said path, and a portion external to said space.

7. In a control structure, the combination with an inductance coil unit comprising a coil support and two coils mounted on said support at opposite sides of a kerf-like space transverse to the axes of said coils, supporting means upon which said support is mounted for adjustment about an axis parallel to and laterally displaced from the axes of the coil, and a vane element movable in a direction transverse to said axes along a path including a portion within said space and a portion external to said space, the portions of said path respectively within and without said space being varied by the angular adjustment of said support about said axis.

WILLIAM H. WANNAMAKER, Jr.

REFERENCES CITED

The following references are of record in the file of this patent:

UNITED STATES PATENTS

| Number | Name | Date |
| --- | --- | --- |
| 804,250 | Miller | Nov. 14, 1905 |
| 1,295,691 | Cahill | Feb. 25, 1919 |
| 1,488,310 | Birch-Field | Mar. 25, 1924 |
| 1,564,555 | Goldsmith | Dec. 8, 1925 |
| 1,679,459 | Willans et al. | Aug. 7, 1928 |
| 1,708,539 | Goldsmith | Apr. 9, 1929 |